United States Patent [19]

Edwards

[11] 4,084,096
[45] Apr. 11, 1978

[54] ELECTRICALLY ACTIVATED INFRARED SOURCE

[76] Inventor: Miles L. Edwards, 13191 Sandhurst Pl., Santa Ana, Calif. 92705

[21] Appl. No.: 768,392

[22] Filed: Feb. 14, 1977

[51] Int. Cl.² ............................................. G01J 1/00
[52] U.S. Cl. ..................................... 250/504; 250/493
[58] Field of Search ........................ 250/494, 495, 504; 313/348, 278

[56] References Cited

U.S. PATENT DOCUMENTS

| 2,085,536 | 6/1937 | Liebel et al. | 250/495 |
| 3,212,169 | 10/1965 | Glaser et al. | 313/348 |
| 3,238,410 | 3/1966 | Beggs | 313/348 |

*Primary Examiner*—Bruce C. Anderson
*Attorney, Agent, or Firm*—Raymond L. Madsen

[57] ABSTRACT

There is disclosed an electrically activated infrared source assembly having a frame member with a pair of substantially parallel sides adapted to receive strands of an elongated wire stretched repeatedly therebetween in a serpentine configuration, each side having a curved surface thereon adapted to receive tangentially thereto and to support thereover end portions of the wire strands stretched from the other side, the curved surface having a multiplicity of grooves therealong adapted to accept the end portions of the wire strands at the point of tangential contact for maintaining the stretched wire strands between the sides in a spaced relationship one to another, each of the curved surfaces having a plurality of projections therealong adapted to engage therearound the end portions of the wire strands. An elongated wire is stretched back and forth in a serpentine configuration between the sides, around the projections and along the grooves, the wire being adapted to be connected to an electrical source of pulsating energy and to be activated thereby to radiate pulsating infrared energy. Each end portion of the wire strands is bonded around a projection up to but not including the region of the grooves.

9 Claims, 4 Drawing Figures

ELECTRICALLY ACTIVATED INFRARED SOURCE

The present invention relates to infrared sources and more particularly to an electrically activated infrared source assembly for producing pulsating infrared energy of constant magnitude and high reliability.

In the field of pulsating electrical infrared sources, it has been the common practice to use a thin filament of heated wire as the source of infrared radiation. Electrical energy is applied to the wire to heat the wire to the appropriate radiating temperature. As the wire is heated, its dimensions expand causing the wire to droop and sag or to move from its cold position into a new position when heated. This constant motion or flexing under the application of electrical power eventually causes the wire to weaken and break at the point of support. The unique frame design of the present invention overcomes this difficulty.

Another problem encountered with pulsating electrically operated infrared sources has been the difficulty of maintaining uniform spacing between the wires as they are heated and their dimensions expand. The resulting change in spacing between the wires creates hotter areas along the wires where one wire is closer in spacing to another wire at a region or point then along other regions of its length. Similarly where a wire is spaced further apart when heated from its adjacent wire, cooler areas of radiation may occur. Therefore, the irregular movement of the wires under heating can create variable hot spots or cold spots of radiation which produce irregularities in the infrared energy output. These problems are overcome by the present invention.

Those concerned with the development of infrared sources have long recognized the need for an infrared source which allows substantially all external infrared radiation incident thereon to be transmitted therethrough. The present invention fulfills this need.

The general purpose of this invention is to provide an electrically operated pulsating infrared source which embraces all the advantages of similarly employed infrared sources and possesses none of the aforedescribed disadvantages. To obtain this, the present invention contemplates a unique frame assembly with two oppositely disposed sides having curved surfaces thereon and projections therefrom which receive and accept the end loops of a serpentine wire configuration stretched therebetween and which wire loops are bonded thereto whereby radiation instability and drift along with short life are avoided.

An object of the present invention is the provision of a pulsating infrared source having a stable and repeatable radiation.

Another object of the present invention is to provide an electrically operated pulsating infrared source having a long life.

A further object of the present invention is the provision of an electrically operated pulsating infrared source having uniform radiation.

Still another object is to provide an infrared source which is substantially transmissive to all external radiation incident thereon.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
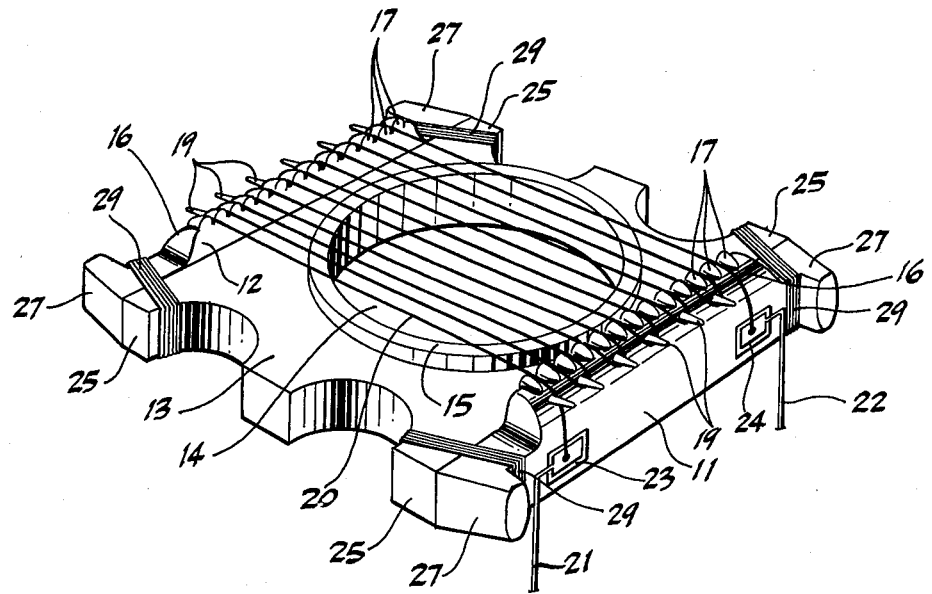
FIG. 1 shows a perspective view of a preferred embodiment of the invention without the application of a bonding substance.

Referring now to the drawings, wherein like reference characters designate like or corresponding parts throughout the several views, there is shown in FIG. 1 (which illustrates a preferred embodiment) a pair of side members 11 and 12, respectively, separated by a spacer member 13 having a circular opening 14 therethrough and centrally located therein rimmed by a circular shoulder 15. Each of the side members 11 and 12 have a rounded or curved surface 16 thereon having a multiplicity of ridges or ribs 17 between which are formed grooves adapted to receive a wire therein. Each curved or rounded surface 16 further has a multiplicity of projecting fingers or hooks 19 adjacent to the multiplicity of ribs or ridges 17. A wire 20 is connected between an electrical conductor 21 attached to a pad 23 on the surface of side 11 and wire 20 is stretched from conductor 21 through a first groove between ribs 17 across spacer 13, across circular shoulder 15 and circular opening 14 to a corresponding groove between ribs 17 on side 12 and is further stretched around a first projection 19 and back through a second groove between ribs 17 on side 12, across spacer 13, over shoulder 15 and opening 14 to a corresponding groove between rib 17 on side 11 and from there around a corresponding projection on side 11 and back through the next adjacent groove between ribs 17 on side 11 and again across spacer 13. Wire 20 is repeatedly stretched in this manner around projections 19 and through grooves between ribs 17 between sides 11 and 12 until a desired number of spaced wire strands is formed over opening 14 in spacer 13. The last strand of wire is stretched from side 12 to side 11 and connected to conductor 22 which is attached to a pad 24 located on a surface on side 11.

Spacer member 13 has four arms 25 located at the four corners thereof which are adjacent ends 27 of each of the sides 11 and 12. A wire 29 is wrapped around ends 27 and 25 at each of the four corners of the frame assembly formed by sides 11 and 12 and spacer 13, to mechanically hold sides 11 and 12 to spacer member 13.

It should be noted that side members 11 and 12 may be made from an anodized aluminum alloy or the like, the surface thereof having the properties of an electrical insulator. Spacer member 13 may be made of kovar or similar material which has a low coefficient of thermoexpansion to prevent the wires from being broken when the assembly is heated.

Figure 2:
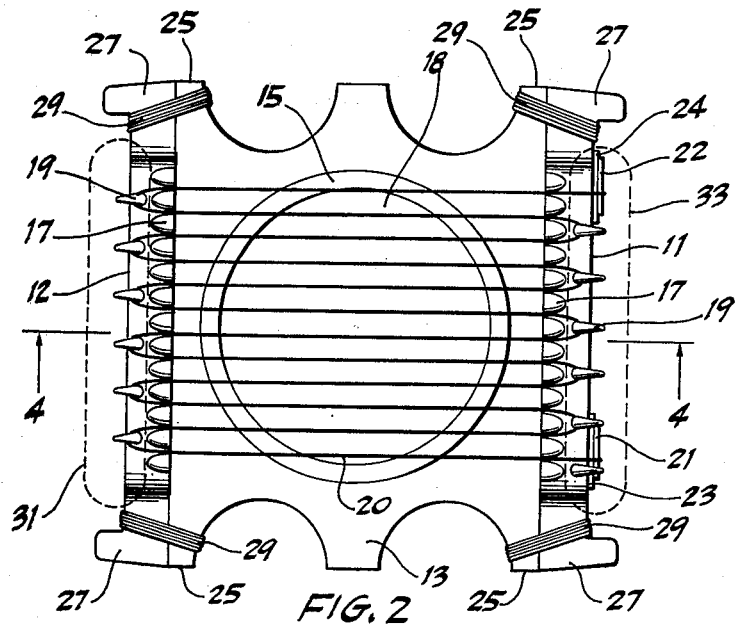
FIG. 2 illustrates a top plan view of the assembly shown in FIG. 1 further including the location of a bonding substance within the dashed lines.

Turning now to FIG. 2, there is shown a top or plan view of the source assembly illustrated in FIG. 1 further including a potting compound or bonding substance covering projections 19 and the wire loops therearound on each of the sides 11 and 12, the bonding substance extending up to but not including the grooves between ribs 17, as indicated by closed dashed line 31 on side 12 and closed dashed line 33 on side 11.

A circular mirror 18 is attached to circular shoulder 15 covering opening 14 in spacer 13 as an alternative structure of the present invention, the mirror closing opening 14 and providing a reflective surface to the infrared radiation emanating from the wires thereabove.

Figure 3:
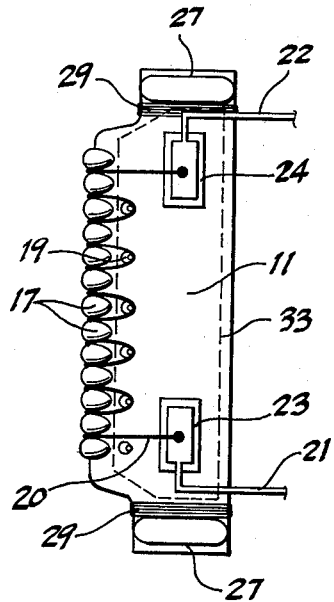
FIG. 3 shows a side elevation of the apparatus shown in FIG. 2.

FIG. 3 is a side elevation of the frame assembly shown in FIG. 3 looking at side member 11. Wire 20 can be seen to clearly pass though the grooves between ribs 17 and around projections 19 on curved surface 16 of side member 11. The potting compound or bonding substance within dashed line 33 is shown to further include and cover mounting pads 23 and 24 and the connecting points between wire 20 and conductors 21 and 22, thereby giving greater mechanical strength to the electrical connection between wire 20 and conductors 21 and 22.

Figure 4:
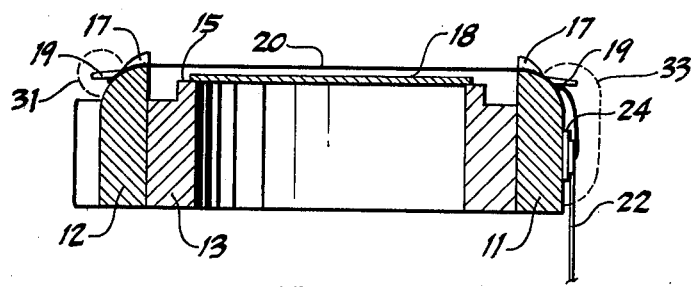
FIG. 4 shows a section of the assembly of FIG. 2 taken on line 4—4 looking in the direction of the arrows.

In FIG. 4 there is illustrated a cross-section view taken along line 4—4 of FIG. 2 in the direction of the arrows showing potting compound or bonding substance 31 covering projections 19 on side 12 up but not including the grooves between ribs 17 thereon. Similarly, potting compound or bonding substance within dashed line 33 on side 11 is shown covering projections 19 thereon as well as covering the connection between conductor 22 and wire 20 mounted on pad 24. Circular mirror 18 is bonded on circular shoulder 15 of spacer member 13 and completely encloses opening 14 as illustrated in FIG. 1.

It should be noted that the potting compound or bonding substance can be a cement or high temperature epoxy such as Sauereisen P-78 cement or the like, capable of withstanding the temperatures of operation of a wire heated to temperatures in the vicinity of 600° to 900° C.

Stretched wire 20 can be made of tungsten with 3% rhenium or the like, having an electrical resistance which increases rapidly with temperature. Typical diameters of the wire used are 0.001 inch to 0.0008 inch. When two source assemblies are utilized as described in U.S. Pat. No. 3,747,349, the primary or non-transmissive source utilizes the smaller diameter wire and the secondary or the transmissive source utilizes the larger diameter wire. Further, the primary source employs a mirror similar to circular mirror 18 illustrated in FIGS. 2 and 4 to reflect and direct as much of the infrared energy radiating from the heated wires segments through an adjacent filter cell and then through the secondary source into a sample cell and from the sample cell to a detector. Consequently, the source assembly described herein is particularly suited to the dual source combination for an analyzer as described in U.S. Pat. No. 3,747,349.

The features of the present invention can best be described by first referring to FIG. 4. The source is activated to radiate infrared energy by applying electrical power to wire 20 causing the wire to heat and radiate infrared radiation. In the process of heating wire 20, the coefficient of thermo-expansion causes the wire to elongate over the span between the grooves on side 11 and the grooves on side 12. Without potting compound or bonding substance within boundaries 31 and 33, it was found that wire 20 would completely lift from the curved surfaces 16 on sides 12 and 11 and become heated down to the point of contact around projections 19 thereon, respectively. The variations in the tension on the various strands of wire 20 caused some wire strands to expand and deviate more from curved surfaces 16 than others, thereby causing some wire strands to have a higher temperature over a greater portion of their span than others producing a variation in infrared radiation from strand to strand. Furthermore, as the wires aged under flexing and changed position with respect to one another further temperature variation was experienced. In order to overcome this difficulty, potting compound was applied in the regions defined by dashed lines 31 and 33 to secure and hold wire 20 around each projection 19 up but not including the grooves between ribs 17 on each of the sides 11 and 12, respectively. The bonding substance or potting compound prevents wire 20 from being lifted up from curved surface 16 of side members 11 and 12 and therefore prevents these portions of wire 20 from heating and flexing away from the curved surface.

As a result, when power is applied to the wire, the hottest portion of the wire is in the center of the span and is substantially constant across each wire span up to the grooves between ribs 17 on each of the curved surfaces of sides 11 and 12, respectively.

The grooves between ribs 17 further provide a fixed spacing between each strand of wire 20 as it is stretched between sides 11 and 12. Thus, when the wire flexes under the application of pulsed electrical power, the controlled spacing prevents one wire from contacting an adjacent strand or approaching it too closely to cause an increased heating in that portion of the wire strand.

It should be further noted that when the potting or bonding substance was extended over the grooves, the wire strands had a tendency to break in the region where they entered the grooves. By having the potting or bonding substance come up to but not include the grooves on curved surface 16 of each of the side members 11 and 12, the wire strands did not have a tendency to break as they flexed under heating and, consequently, a longer life was achieved. Curved surfaces 16 on side members 11 and 12 further provide a smooth surface transition for tangentially contacting the ends of each wire strand as it expands and flexes under heating.

In operation in an infrared analyzer, conductors 21 and 22, as illustrated in FIGS. 1 and 3, are adapted to be connected to a source of pulsating electrical power. When a pulse of electrical power is applied, wire 20 will heat and expand causing it to flex outwardly away from mirror 18 illustrated in FIG. 4. This expansion and flexure further causes wire 20 to lift outwardly and away from the grooves between ribs 17 on sides 11 and 12, respectively. The potting compound or bonding substance within boundaries 31 and 33 keeps wire 20 in contact with curved surfaces 16 on sides 11 and 12 and thereby prevents the wire from becoming heated and expanding in the vicinity of the supporting projections 19 and the grooves between ribs 17.

It should be further noted that when mirror 18 is removed from the circular opening 14 in spacer 13, that infrared energy may be transmitted substantially therethrough, as illustrated in FIG. 1, between the wire strands of the source assembly to produce an infrared source assembly which is substantially transmissive to infrared energy. This configuration has particular application to a dual source infrared assembly such as described in U.S. Pat. No. 3,745,349.

It now should be apparent that the present invention provides a mechanical assembly which may be employed in connection with an infrared source to produce a stable source of pulsating infrared energy having a long life.

Although various components, etc., have been discussed in connection with a specific embodiment of a pulsating infrared source assembly constructed in accordance with the teachings of the present invention, other structures and materials may be utilized. Furthermore, it will be understood that although an exemplary embodiment of the present invention has been disclosed and discussed, other applications and mechanical arrangements are possible and that the embodiments disclosed may be subjected to various changes, modifications and substitutions without necessarily departing from the spirit of the invention.

What is claimed is:

1. An infrared source assembly comprising:
 a frame member having a pair of substantially parallel sides adapted to receive segments of an elongated wire stretched repeatedly therebetween in a serpentine configuration, each side having a curved surface thereon adapted to receive tangentially thereto and to support thereover end portions of the wire strands stretched therebetween, said curved surface having a multiplicity of ribs therealong with grooves therebetween adapted to receive and accept the wire strands at the point of tangential contact for maintaining the stretched wire strands between said sides in a spaced relationship one to another, each of said curved surfaces having a plurality of projections therealong adapted to engage therearound end portions of the serpentine loops of stretched wire; and
 an elongated wire stretched back and forth in a serpentine configuration between said sides, around said projections and along said grooves, said wire adapted to be connected to an electrical source of pulsating energy and to be activated thereby to radiate pulsating infrared energy.

2. The infrared source assembly described in claim 1 further including a bonding substance covering each and every projection and the portion of said wire therearound up to but not including the region of said grooves, thereby securing said wire to said curved surface of each side of said frame member.

3. The infrared source assembly described in claim 2 wherein said bonding substance is a potting cement.

4. The infrared source assembly described in claim 3 wherein said wire is tungsten with substantially 3% rhenium.

5. The infrared source assembly described in claim 4 wherein each of said pair of sides is an anodized aluminum alloy.

6. The infrared source assembly described in claim 1 wherein said frame member includes a spacer member between said pair of parallel sides, said spacer member having an opening therethrough with a shoulder therearound, said opening substantially being located adjacent said stretched strands of said wire between said parallel sides.

7. The infrared source assembly described in claim 6 further including a mirror mounted on said shoulder of said spacer member adjacent said stretched strands of said wire for reflecting the infrared energy incident thereon from said stretched wire strands.

8. The infrared source assembly described in claim 7 wherein said spacer member is made of a material such as kovar.

9. The infrared source assembly described in claim 1 wherein said multiplicity of grooves are formed by the juncture of small ribs aligned side by side along said curved surface.

* * * * *